(12) United States Patent
Gabl et al.

(10) Patent No.: US 6,475,337 B2
(45) Date of Patent: Nov. 5, 2002

(54) PROCESS FOR AERATING DISPERSIONS

(75) Inventors: Helmuth Gabl, Graz (AT); Erwin Hertl, Judendorf (AT); Bernhard Scherzinger, Graz (AT)

(73) Assignee: Andritz AG, Graz (AT)

( * ) Notice: Subject to any disclaimer, the term of this patent is extended or adjusted under 35 U.S.C. 154(b) by 0 days.

(21) Appl. No.: 09/776,257

(22) Filed: Feb. 2, 2001

(65) Prior Publication Data

US 2001/0025693 A1 Oct. 4, 2001

(30) Foreign Application Priority Data

Feb. 3, 2000 (AT) ................................................ 169/00

(51) Int. Cl.[7] .............................. D21H 11/14; D21B 1/32
(52) U.S. Cl. ............................. 162/4; 162/55; 209/164; 209/165; 209/170; 210/221.1; 210/221.2
(58) Field of Search ....................... 162/4, 55; 209/164, 209/165, 170; 210/221.1, 221.2

(56) References Cited

U.S. PATENT DOCUMENTS

| | | | | |
|---|---|---|---|---|
| 4,722,784 A | * | 2/1988 | Barnscheidt | 209/164 |
| 5,279,424 A | * | 1/1994 | Britz et al. | 209/170 |
| 5,330,655 A | * | 7/1994 | Schweiss et al. | 210/703 |
| 6,279,749 B1 | * | 8/2001 | Gommel et al. | 209/168 |

* cited by examiner

Primary Examiner—Dean T. Nguyen
(74) Attorney, Agent, or Firm—Alix, Yale & Ristas, LLP

(57) ABSTRACT

A device and process for aerating dispersions, particularly for flotation of pulp suspensions, in a de-inking process. The process includes at least two stages, where each stage has a separate liquid circulating system which sucks in the gas or air and mixes it with the liquid. The device has at least two flotation cells, with each of the cells having a separate injector and a separate circulation system including a pump.

6 Claims, 5 Drawing Sheets

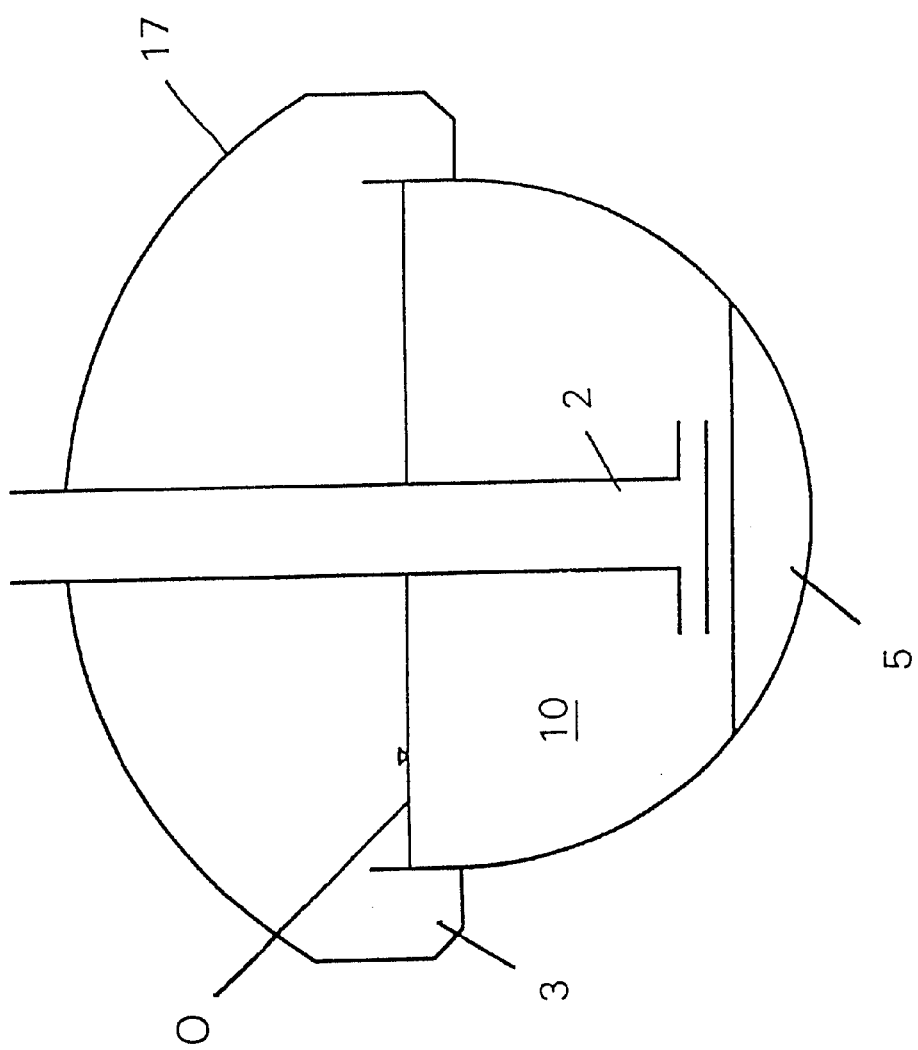

PROCESS FOR AERATING DISPERSIONS

BACKGROUND OF THE INVENTION

This invention relates generally to apparatus and processes for aerating dispersions. More particularly, the present invention relates to apparatus and processes for aerating pulp suspensions during de-inking.

De-inking flotation is a mechanical process for removing impurities and ink particles from pulp suspensions produced particularly in waste paper treatment. Here hydrophobic solids, such as ink particles or stickies, are brought into contact with gas bubbles in a suitable flotation cell. The adhering solids are carried to the surface of the liquid together with the bubbles and can be removed there as scum. The pulp is discharged with the accept due to its hydrophile nature. To generate the gas bubbles, one of the devices used successfully for this purpose is the self-priming injector. Since the process for selective removal of printing ink from pulp suspensions only operates with low efficiency, multi-stage processes, as known, e.g. from DE 41 16 916 C2, are normally used. Here the entire pulp suspension is fed through injectors in order to create a bubble surface large enough for successful flotation. The accept from each stage is used as feed to the following stage for intake of the gas flow by injectors. The scum from all stages is collected and can then be floated once again in a secondary stage in order to recycle the fibers. The disadvantage of processes of this kind is that they are susceptible to production fluctuations, have no means of adapting the air content to the specific application and require a great deal of measuring and process equipment to run the secondary flotation stage.

SUMMARY OF THE INVENTION

The invention is, therefore, based on the task of designing a multi-stage energy-efficient process for flotation of pulp suspension which is insensitive to fluctuations in production and can be adapted easily to different applications and compositions of raw material.

The invention is thus characterized by each stage having a separate liquid circulating system which sucks in the gas or air and mixes it with the liquid. Since the feed and injector propulsive jet used to suck in the gas do not interact, an additional degree of freedom is formed which makes it possible to set the air content independently of the feed rate. As a result the plant can be adapted very easily to changes in feed volume flows.

An advantageous further development of the invention is characterized by the air content being controlled independently of the feed rate. With this control facility the air content can be adapted easily to changes in feed conditions.

A favorable configuration of the invention is characterized by the air feed rate being set according to the properties of the pulp suspension. In this way optimum flotation success can be obtained for each individual application.

A favorable further development of the invention is characterized by different quantities of air being applied to the individual stages. Thus, special raw materials can also be floated efficiently without influencing the raw material feed and thus, the throughput.

An advantageous configuration of the invention is characterized by the suspension being fed to the next cell/stage in the lower section of the cell/stage. Feeding the suspension in at the lower section of the cell/stage prevents the impurities consolidated in the scum from being discharged with the accept.

A favorable further development of the invention is characterized by at least one secondary stage being provided, which is operated with the overflow from the primary stage and whose accept is fed to the first primary stage. As a result, low fiber losses can be obtained in flotation of pulp suspensions, where the secondary cells can have the same design as the primary cells.

The invention also refers to a device for aerating dispersions, particularly a flotation device, for example for de-inking pulp suspensions, with at least two flotation cells, characterized by a separate injector being provided in each stage and which is connected to an assigned pump to form a liquid circulating system. This provides a favorable means of excluding any interaction between feed and injector propulsive jet, thus forming an additional degree of freedom.

A favorable further development of the invention is characterized by openings being provided in the cell dividing walls at floor level. This arrangement allows the dispersion to flow into the next cell in each case, but prevents the scum from being carried along with it.

An advantageous configuration of the invention is characterized by overflow channels being provided in each cell and which are connected to a collecting tank via a collecting main. In this way the scum from each of the primary cells can be collected and either discharged or subjected to further treatment all together.

A favorable configuration of the invention is characterized by at least one secondary flotation cell, operated with the overflow front the primary cells and whose accept is fed to the first primary cell, being provided and by this secondary flotation cell having a connection to the collecting tank. By using a secondary flotation cell upstream of the primary flotation, fiber losses can be reduced even further.

A favorable further development of the invention is characterized by at least two cells being arranged in a tower. Such an arrangement permits even better separation of impurities from the accept.

An advantageous further development of the invention is characterized by at least three cells being combined to form a circular flotation plant. With this arrangement, good separation of impurities can be achieved with a low space requirement.

A favorable further development of the invention is characterized by several injectors being provided in each cell. If several injectors are provided, particularly at different points within a cell, this allows higher throughput on the one hand, and on the other it permits better distribution of the suspension and of the liquid bubbles.

BRIEF DESCRIPTION OF THE DRAWINGS

The present invention may be better understood and its numerous objects and advantages will become apparent to those skilled in the art by reference to the accompanying drawings in which:

FIG. 5 is a cross-section view of the flotation unit of FIG. 1.

DETAILED DESCRIPTION OF THE PREFERRED EMBODIMENT

Figure 1:
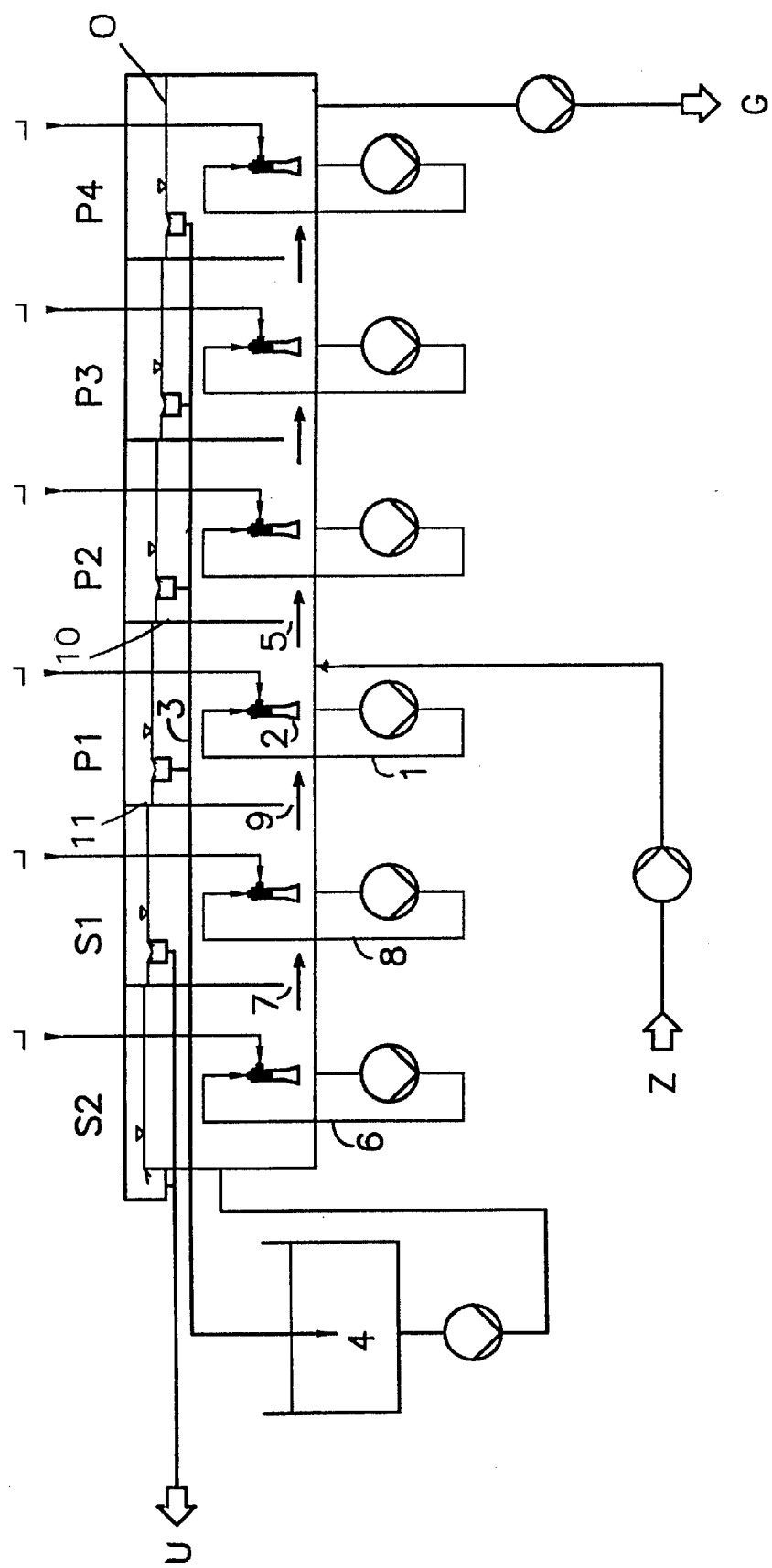
FIG. 1 is a simplified schematic diagram of a first embodiment of a flotation unit in accordance with the invention.

FIG. 1 provides a diagram of a flotation plant with four primary cells P1, P2, P3, P4 and two secondary cells S1, S2.

The feed of pulp suspension Z enters the first primary cell P1 at a suitable point. The bubbles are generated using the cells internal circulating system 1, which does not interact with the feed, by the injector 2 which sucks in air L and mixes it into the suspension. The entire flotation plant is largely filled with suspension, on whose surface O a scum forms, which contains as much as possible of the substances and ink particles to be removed by flotation.

After the ink and impurities have been removed from the pulp in the first primary cell P1, the accept moves on to the second primary cell P2 through a opening 5 in the dividing wall 10 at floor level. There, and in all other primary cells, the suspension is treated in the same way with bubble generating injectors operated by the cells' internal circulating systems and is discharged at the end of the plant as accept G.

The scum collected from all primary cells P1 to P4 can drain off through a scum channel 3 into a tank 4. From this interim tank 4 the overflow, from which the scum has largely been removed in the meantime, is fed to the secondary cell S2. Gasification takes place there once again using the cell's internal circulating system 6. The accept from the secondary cell S2 is transferred to the secondary cell S1 at the floor-level opening 7. After gasification by the circulating system 8, the scum from the secondary cells can be discharged as overflow U. The accept from the secondary cell S1 is transferred to the first primary cell P1 through the floor-level opening 9 in the dividing wall 11.

Figure 2:
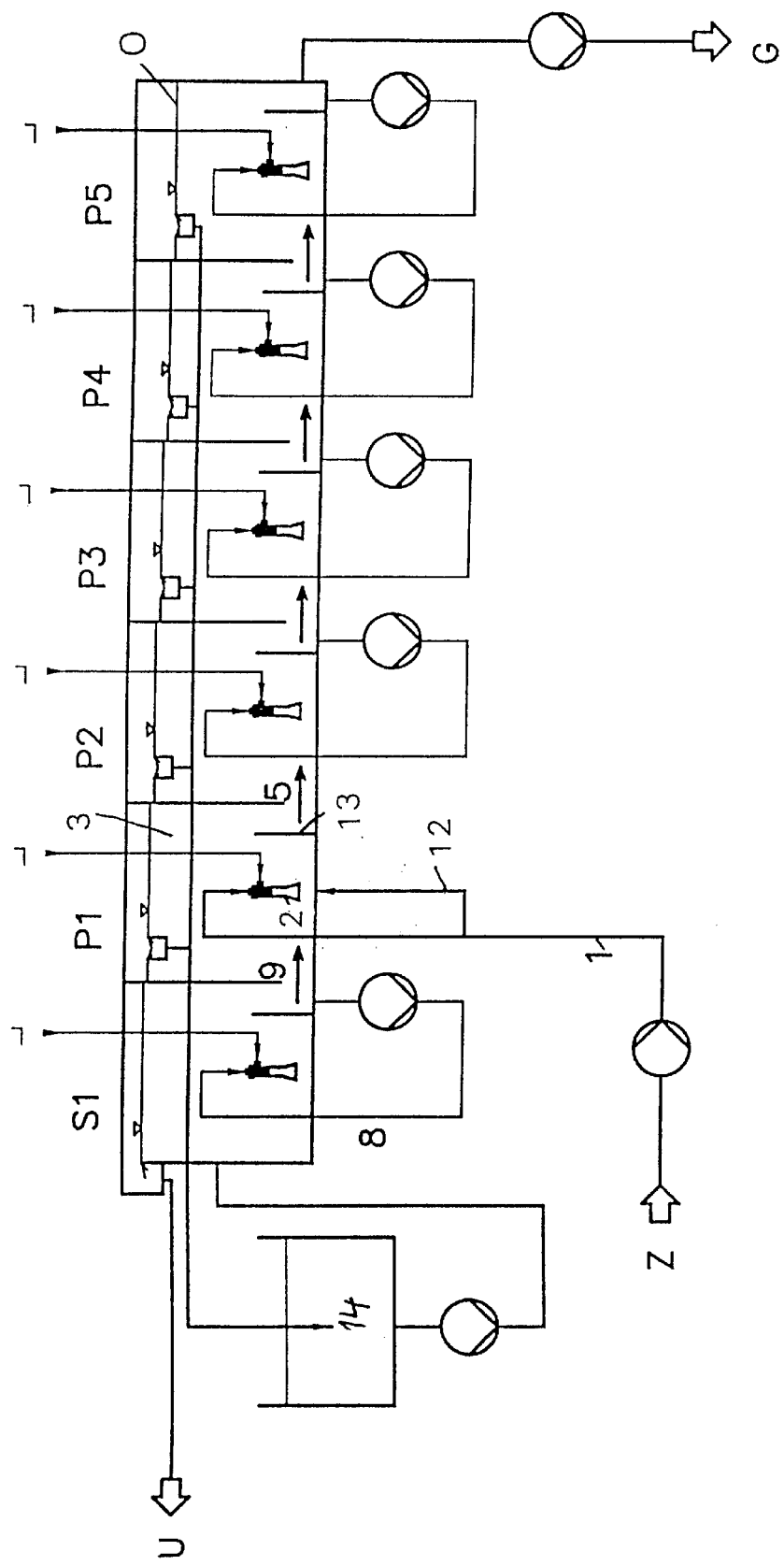
FIG. 2 is a simplified schematic diagram of a second embodiment of a flotation unit in accordance with the invention.

In FIG. 2 there is only one secondary cell S1 and the feed Z is used partly as propulsive jet for the injector 3. The remaining partial jet of the feed Z enters the first primary cell P1 at a suitable point. The accept from the individual cells passes through openings 5 in the dividing walls 10 into the next primary cell P2, PS, P4, P5 in each case and can then be discharged as accept G. In order to avoid air L being sucked in with the cells internal injector circulating system, a safety device 13 is used in each cell and the suspension for the injector propulsive jet is not discharged until it has passed the safety device. The scum collected from the primary cells P1 to P5 is carried along a scum channel 3 to an intermediate tank 4, from where the overflow—with the scum removed—is brought into the secondary cell S1. The bubbles are generated via a circulating system 8 by an injector. The accept from the secondary cell S1 flows through the opening 9 into the primary cell P1 and the scum from the secondary cell S1 is discharged as overflow U.

Figure 3:
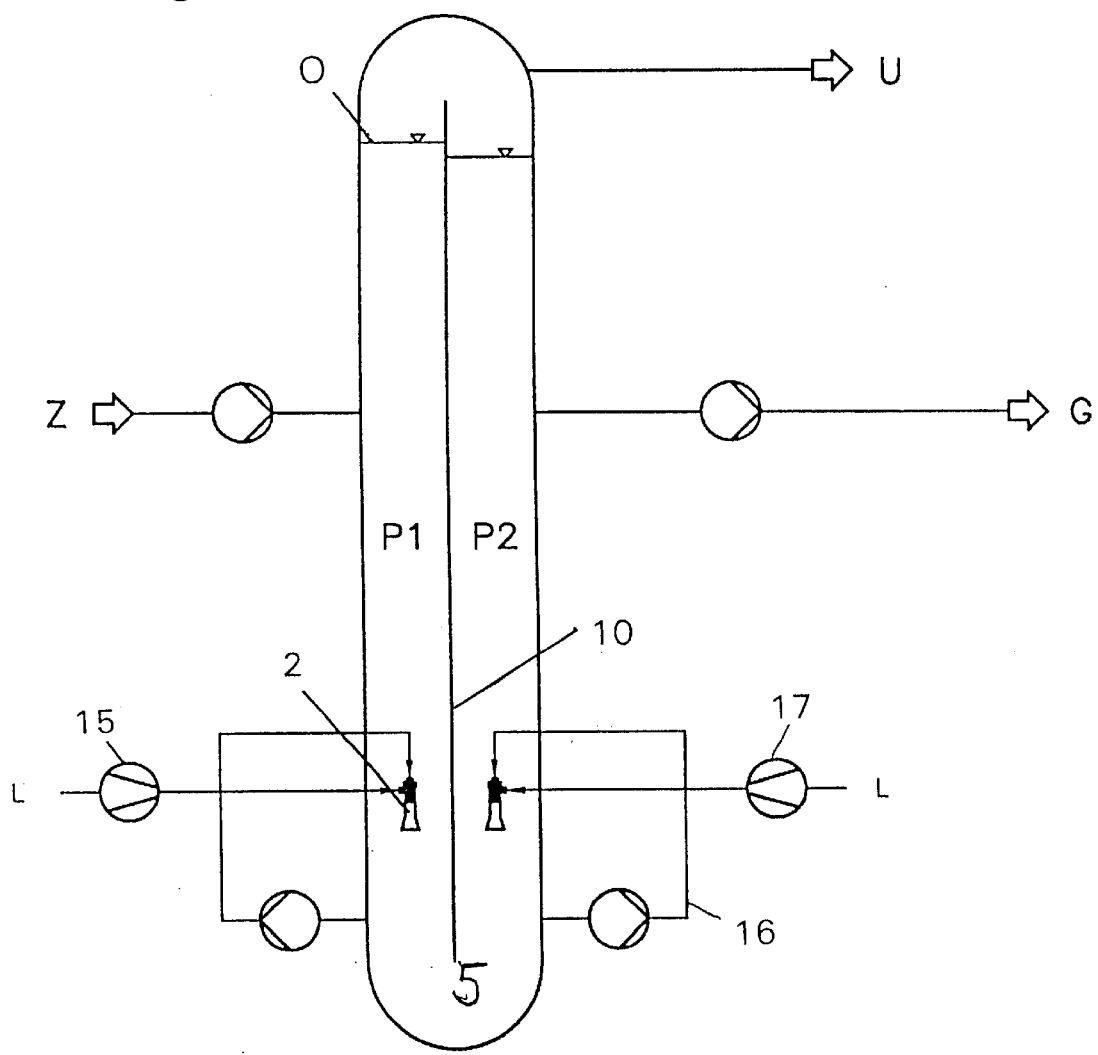
FIG. 3 is a simplified schematic diagram showing two of the flotation cells of FIG. 1 arranged in a tower.

FIG. 3 shows an arrangement of two primary cells P1 and P2 in a tower to make partial use of the counter-current principle and also to obtain a better separating effect due to the height of the liquid level. The feed Z is brought to the primary cell P1 by the injector, to which the air is supplied by a compressor 15 if the suspension level is too high. The accept is transferred to the second primary cell P2 through the opening 5 in the dividing wall 10 between the two cells. The bubbles in the second primary cell P2 are generated by the suspension circulating system 16 using the compressor 17. The accept G and the overflow U (scum) collected can be discharged.

Figure 4:
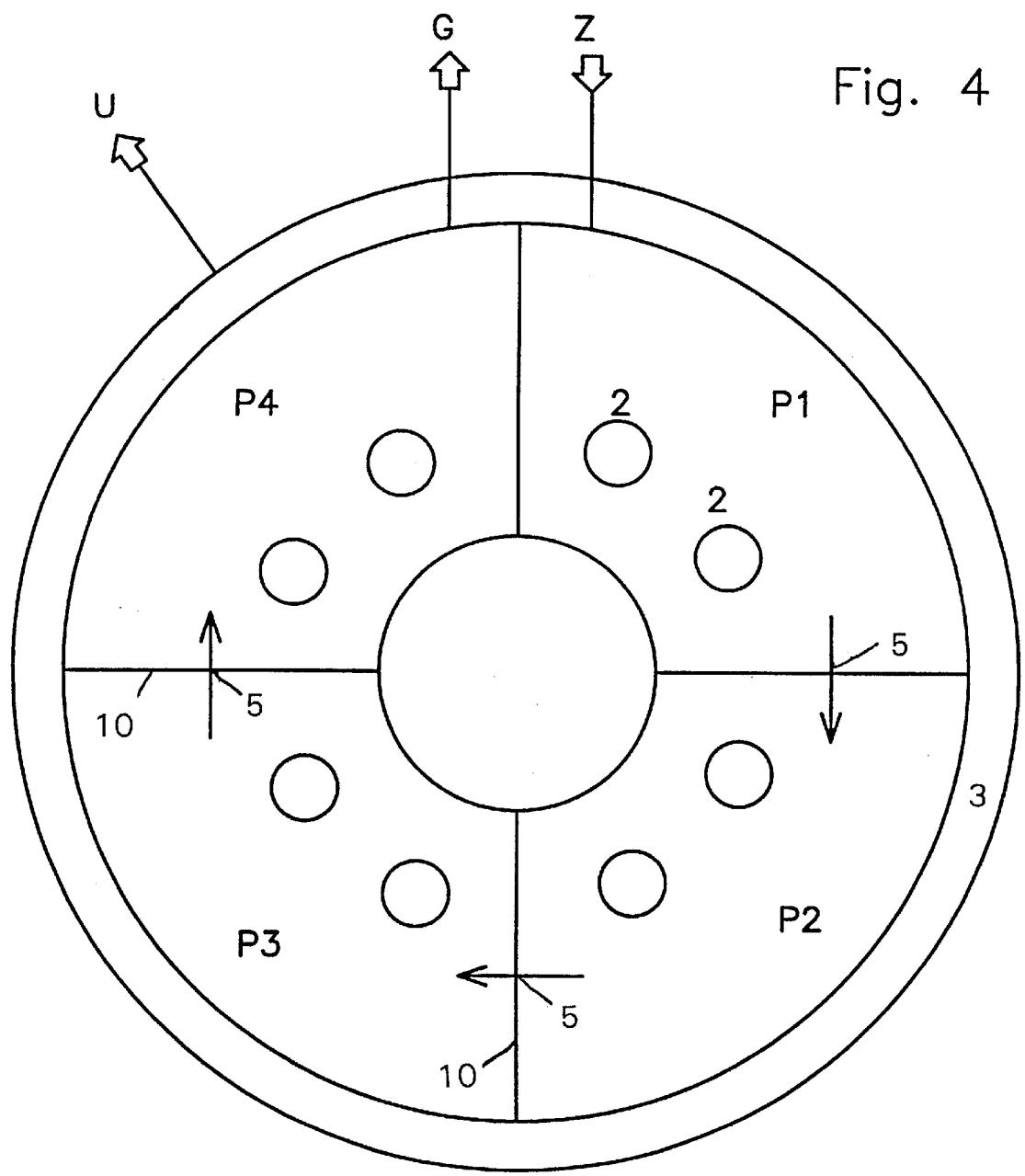
FIG. 4 is a simplified schematic diagram of a third embodiment of a flotation unit in accordance with the invention.

FIG. 4 contains a design of the invention with four primary cells, designed as a circular flotation plant. The ink and impurities from the feed Z are floated in the first primary cell P1 with bubbles from the gasification devices (injectors 2). The accept flows through openings 5 in the lower section of the dividing walls 10 into the next primary cell P2, P3 or P4 in each case and can be discharged as accept G from the fourth primary cell P4 after four flotation stages. The overflow from all cells is collected in the scum channel 3 and discharged as overflow U.

FIG. 5 shows a possible cross-section through a flotation plant according to FIGS. 1 and 2, respectively. The dish-shaped flotation cell with the cover 17 is largely filled with suspension. The bubbles are generated by the aeration device (injector) 2 and convey the ink particles and impurities to the surface O of the liquid, where they can drain off as scum along the scum channel 3. The accept from this cell enters the next cell through the opening 5 in the dividing wall 10 and is brought into contact with gas bubbles again there.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Process for aerating pulp suspensions in a de-inking apparatus to produce accept pulp suspension, the apparatus having a first primary cell and at least one subsequent primary cell, each of the primary cells having a separate liquid circulating system including an injector, the process comprising the steps of:

a) receiving a flow of pulp suspension at a feed rate in the first primary cell;

b) sucking in air with the injector of the first primary cell;

c) mixing the air and pulp suspension with the injector of the first primary cell;

d) feeding accept pulp suspension to a subsequent primary cell:

e) sucking in air with the injector of the subsequent primary cell;

f) mixing the air and pulp suspension with the injector of the subsequent primary cell;

g) repeating steps d)–f) for each remaining subsequent primary cell.

2. Process according to claim 1, further comprising the step of controlling the air content independently of the pulp suspension feed rate.

3. Process according to claim 1, further comprising the step of setting an air feed rate according to the properties of the pulp suspension.

4. Process according to claim 1, further comprising the step of sucking in different quantities of air in each primary cell.

5. Process according to claim 1, wherein each primary cell has a lower section and the accept pulp suspension being fed to the subsequent primary cell is fed through the lower section.

6. Process according to claim 1, wherein the pulp suspension in each primary cell has a top surface and the de-inking apparatus further has at least one secondary cell, the process further comprising the steps of:

h) forming a scum at the top surface of the pulp suspension in each primary cell;

i) feeding an overflow of pulp suspension from each primary cell to the secondary cell, the overflow including the scum at the top surface of the pulp suspension in the primary cell; and j) feeding accept pulp suspension from the secondary cell to the first primary cell.

* * * * *